Figures 2, 4:
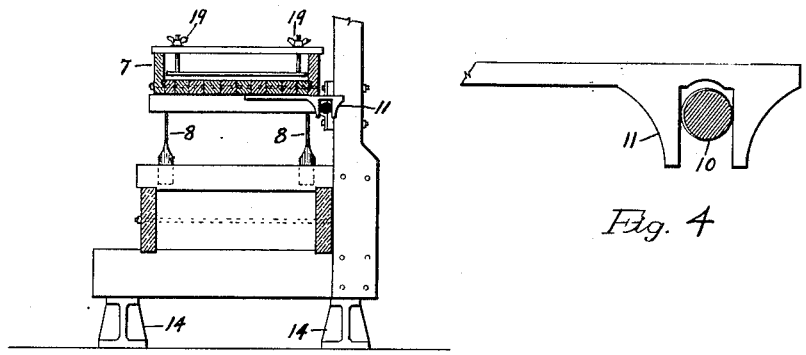

May 13, 1924.

S. J. MARSH 1,494,071

PROCESS FOR RECOVERING PRECIOUS METALS

Filed Aug. 15, 1922

INVENTOR
Samuel J. Marsh
BY
L. L. Westfall
ATTORNEY

Patented May 13, 1924.

1,494,071

UNITED STATES PATENT OFFICE.

SAMUEL J. MARSH, OF SPOKANE, WASHINGTON.

PROCESS FOR RECOVERING PRECIOUS METALS.

Application filed August 15, 1922. Serial No. 582,051.

*To all whom it may concern:*

Be it known that I, SAMUEL J. MARSH, citizen of the United States of America, residing at Spokane, Spokane County, State of Washington, have invented new and useful Improvements in a Process for Recovering Precious Metals, of which the following is a specification.

My invention relates to the recovery of precious metals and has for its object the extraction and recovery of gold, platinum, platinum alloys as they occur in nature, and osmiridium, when said metals are simply associated with black sand and other ores, or when they occur, wholly or in part, as inclusions in the sand grains or ores.

I have found that metals of the said group often occur in very small grains and as "flour" and also as flakes, which are generally very thin and often in a cup like form, in which condition, owing to the greater surface they present in proportion to their mass weight, they are buoyed up by the more compact grains of the sand, and often float upon its surface, or even upon the surface of the water.

I have also found that in certain localities, these metals occur as inclusions within the grains of sand, both in the form of dust, (flour) and also minute flakes.

In both of the conditions above described, it is impossible to effect a concentration or separation of the metals by mechanical means alone, by reason of the fact, as before stated, that, owing to the greater surface presented in proportion to their mass weight, they cannot be settled mechanically through the mass of the black sand grains, even when such sand is ground to a fine state of division.

I have also found that in some of the rock ores, such as certain lavas which carry platinum, that the platinum metals occur in the colloidal state, in which condition it is impossible to recover them by any mechanical means.

My invention is based upon the discovery of the fact, that particles of the said metals, even when occurring in a state so fine as not to be perceived by the ordinary microscope, may be almost instantly coated or plated with other metals which will amalgamate with mercury, thus giving them an added mass weight, in which condition they may be settled mechanically through the mass of sand grains, and become mixed with a quantity of mercury, from which they are easily separated by the well known principles of distillation.

In the general operation of the process, the material containing the described metals is delivered to the plant in the form of concentrates or as rock ores. The preliminary or preparatory work for the actual work of recovery of the platinum metals, consists of five stages or operations, described as follows:—

1. Separation of clay and other fine sediments.

This is effected by passing the material through a series of settling vats, or by concentration, preferably the Allen cone.

2. Amalgamation of the free gold.

When much free gold is present, it is desirable to recover as much as possible before delivering to the mill, in order to keep the mill from "cushioning". This is effected by any good amalgamating device, such as the Marsh amalgamator.

3. Fine crushing or grinding.

The work of this stage has a two-fold purpose: first, to reduce the material to sufficient fineness to liberate any included metal particles, preferably to 300-mesh or finer; second, to change the form of the metallic flakes to a more compact mass, such as wires or minute spheres.

For this purpose a line-contact mill is employed, such as the Marathon rod mill or the Marcy roller mill.

4. Second amalgamation of the gold.

This is the gold which has been liberated by the fine crushing. This is accomplished in the same manner as in stage 2.

5. Dewatering.

To prepare the material thus produced, for the separation of the platinum metals, it is desirable to eliminate, as much as possible, the contained water, and to wash out most of the alumina. For this purpose an Allen cone or slime concentrator is used.

It is obvious that the details of these steps will be varied to meet the particular conditions.

The recovery of the platinum metals is based upon the fact, as before stated, that metals of the platinum group, which generally occur in alluvial deposits as native platinum, and alloys of platinum metals, and as osmiridium, even when occurring in microscopic particles, may be almost instantly coated or plated with a variety of other metals, in a proper solution, if influenced by a sufficiently strong electro-galvanic current, and when so plated will amalgamate with mercury. I have found by extensive experiments that the compounds of silver, gold, copper, zinc and sodium may be used for this purpose. As an aid in describing the operation of the process, I have accompanied this specification with some figures of drawings, illustrative of an apparatus whereby the process is made effective.

Figure 1:
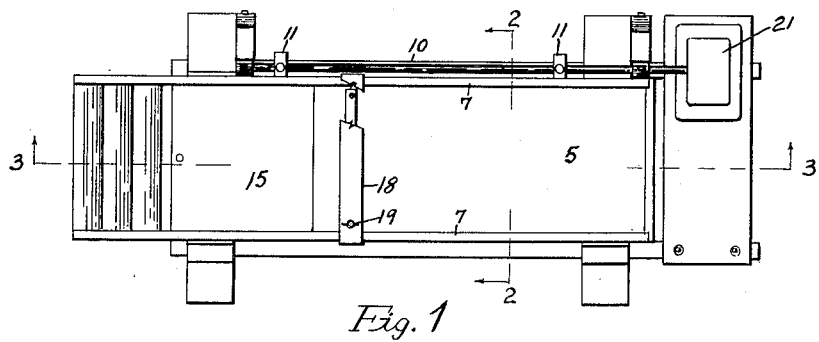
Figure 3:
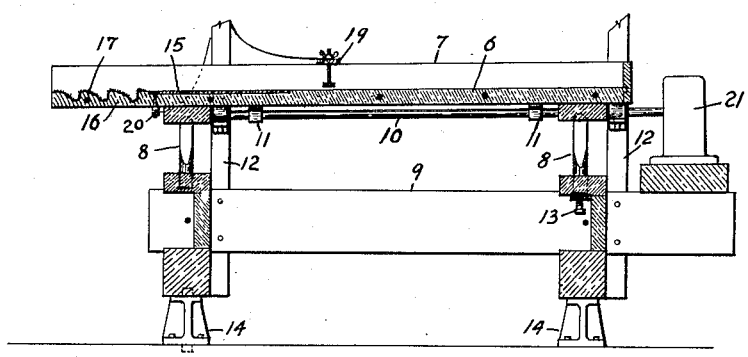

Figure 1 is a plan view of a vibrating table, plate and riffles, conventionally shown as being actuated by means of an electric motor, Figure 2 is a sectional view taken on the line 2—2 of Figure 1, Figure 3 is a sectional view taken on the line 3—3 of Figure 1 and Figure 4 is an enlarged detail view, showing a cross-section of an eccentric rod and a broken-away view of the connection with the same.

As an illustration, the operation, using copper may be described. A solution of copper sulphate in water containing a little free sulphuric acid, to which is added a solution of mercuric nitrate is made up and stored in a tank.

The de-watered pulp and solution in the proportion of about one to one, is fed into the upper or feed end 5 of a vibrating table 6 having slightly raised sides 7. The table is eighteen inches in width by six feet in length and sets upon wood springs 8 attached to a solid frame or bed piece 9. A lateral motion is given to the table by an eccentric rod 10 rotatably mounted on supports 12 on the bed piece 9, the eccentric rod 10 being connected with the table 6 by means of arms 11 about one foot from each end, the motion being about 250 strokes per minute, with a length of stroke of from ¼ inch to ⅜ inch. The actuation of the rod 10 is by means of an electric motor 21. The table 6 is adjustable so as to give the same a grade of from $\frac{1}{16}$ inch to ¼ inch to the foot as may be found desirable by means of screws 13, whereby the springs 8 at the feed end 5 of the table 6 may be raised or lowered. The entire construction is insulated by means of an earthenware base 14. Three and one half feet from the upper end of the table 6 is placed a thick plate 15 of pure copper, eighteen inches square. This plate is plated on one side and the edges with silver and the other side covered with an impervious paint, the plate being set into the table so as to make a straight surface. Below the plate 15 a set of riffles 16 are cut in the bottom of the table 6, which are lined with woolly blankets 17.

A dynamo with a transformer, capable of delivering a current variable at will, furnishes the current to the annode 18, placed near the upper end of the plate 15, and adjustable laterally by means of a slidable contact with the raised sides 7 of the table 6 and vertically by means of screws 19. In operation the anode is placed so that it just makes contact with the top of the flowing stratum of pulp and solution. The plate 15 is coated with a soft zinc amalgam, fresh applications of which are added from time to time as the surface is observed to become dry. A connection 20 is made with the lower end of the plate, which becomes the cathode to complete the circuit.

The action is a follows:—The pulp is fed into the machine, where it encounters the solution in the proper proportion, and travels slowly down the incline, the vibrating motion spreading it evenly over the width of the table. As the pulp passes under the anode, which it just touches, a decomposition of the solution takes place, the particles of metal are plated with a thin film of copper, which is instantly amalgamated with the mercury also liberated from the solution, both metals being in the nascent state and very active. The result of this amalgamation greatly increases the individual weight of the particles of metal, which again by the vibrating motion are caused to settle to the mercury-zinc plate, where they are held firmly until removed at will, by cleaning in the ordinary way, while any pieces of amalgam breaking away, by reason of neglected cleaning or allowing the amalgam to become hard are caught in the blanket lined riffles below the plate. The amalgam thus produced is first retorted in the usual way to recover the mercury. The resulting mass is then treated with a weak solution of sulphuric acid to recover the copper, in the form in which it can again be used. The impoverished solution is pumped to a second tank, where it is again standardized and run to the stock solution tank, thus making the process continuous.

It is obvious that the process may be carried out by using any other mechanical device or machine which will bring the materials into contact with the solutions of the plating metals, with the proper arrangement of the current and mercury, the principle of the process remaining the same.

Having described my invention, what I claim is:—

1. A process of recovering gold, platinum, alloys of the platinum metals, or osmiridium, when such metals or alloys occur in the native state, associated with black or other sands, by electrolytically plating the particles of such metals by any metal which will amalgamate with mercury, and simultaneously coating the so plated metallic particles with mercury, also by electrolysis and recovering the same by ordinary methods of amalgamation.

2. A process of recovering gold, platinum, alloys of platinum metals, or osmiridium, when such metals and alloys occur in the native state, but are wrapped up as inclusions in the grains of sand or in the mass of rock ores, by crushing or grinding the said materials sufficiently fine to liberate the said metal particles, and plating by electrolysis the said liberated particles with any metal which will amalgamate with mercury, and simultaneously coating the so plated articles with mercury also by electrolysis, and recovering the same by ordinary methods of amalgamation.

3. A process of recovering gold, platinum, alloys of the platinum metals, or osmiridium by electro-plating such metals in any state of division with any other metal which will amalgamate with mercury, and bringing such plated particles into contact with mercury by the use of any mechanical device capable of bringing about such contact.

4. A process of recovering gold, platinum, alloys of the platinum metals, or osmiridium, by electro-plating such metals with a metal which will amalgamate with mercury, and bringing such plated particles into contact with mercury.

In testimony whereof I affix my signature.

SAMUEL J. MARSH.